(12) United States Patent
Depaolantonio

(10) Patent No.: US 7,103,149 B1
(45) Date of Patent: Sep. 5, 2006

(54) OPTICAL TRANSPORT CONCENTRATOR AUDIT SYSTEM AND METHOD

(75) Inventor: Joe Depaolantonio, Apex, NC (US)

(73) Assignee: Cisco Technologu, Inc., San Jose, CA (US)

( * ) Notice: Subject to any disclaimer, the term of this patent is extended or adjusted under 35 U.S.C. 154(b) by 83 days.

(21) Appl. No.: 09/828,022

(22) Filed: Apr. 6, 2001

(51) Int. Cl.
H04M 3/22 (2006.01)

(52) U.S. Cl. ................................. 379/9.02; 379/9.06

(58) Field of Classification Search .............. 379/1.01, 379/1.03, 1.04, 9.02, 9.03, 9.06, 11, 15.01, 379/15.03, 196; 359/109, 110; 703/23; 709/201, 223, 224, 220, 227, 229, 250; 370/400, 370/351, 466, 244, 352, 389; 707/9–10, 707/201; 345/764, 853
See application file for complete search history.

(56) References Cited

U.S. PATENT DOCUMENTS

| | | | | |
|---|---|---|---|---|
| 5,367,394 A | 11/1994 | Chuter et al. | ................ | 359/110 |
| 5,561,542 A | 10/1996 | Kosugi et al. | ............... | 359/118 |
| 5,663,819 A | 9/1997 | Lewis | ......................... | 359/118 |
| 5,968,122 A | 10/1999 | Schlosser et al. | ............ | 709/223 |
| 5,995,256 A | 11/1999 | Fee | ............................. | 359/125 |
| 6,026,500 A | 2/2000 | Topff et al. | .................... | 714/26 |
| 6,072,609 A | 6/2000 | Masuda | ........................ | 359/110 |
| 6,115,743 A * | 9/2000 | Cowan et al. | ............... | 709/224 |
| 6,154,273 A | 11/2000 | Suzuki | ........................ | 356/73.1 |
| 6,229,540 B1 * | 5/2001 | Tonelli et al. | ............... | 345/735 |
| 6,233,074 B1 | 5/2001 | Lahat et al. | ................. | 359/118 |
| 6,344,910 B1 | 2/2002 | Cao | ............................. | 359/110 |
| 6,377,725 B1 | 4/2002 | Stevens et al. | ............... | 385/24 |
| 6,456,306 B1 * | 9/2002 | Chin et al. | .................... | 345/810 |
| 6,470,385 B1 | 10/2002 | Nakashima et al. | ......... | 709/224 |
| 6,529,473 B1 | 3/2003 | Bavant et al. | ............... | 370/217 |
| 6,583,901 B1 | 6/2003 | Hung | ........................... | 359/124 |
| 6,584,535 B1 | 6/2003 | Oullet | ........................... | 710/305 |
| 6,615,261 B1 * | 9/2003 | Smørgrav | .................... | 709/224 |
| 6,678,475 B1 | 1/2004 | Turban et al. | ................. | 398/79 |
| 2001/0012141 A1 | 8/2001 | Takai et al. | ................. | 359/110 |
| 2002/0069275 A1 | 6/2002 | Tindal | ......................... | 709/223 |

* cited by examiner

Primary Examiner—Barry Taylor

(57) ABSTRACT

The present invention is a system and method that facilitates audits of network device (e.g., an optical network concentrator) characteristics and operations and presents results in a convenient and user friendly format. The present invention automated network communication device audit tool system and method gathers network communication device information automatically, parses the gathered information automatically, determines if additional information is required, analyzes the characteristic and operations of said network communications device; and reports network communication device information in convenient format including identification of problems and potential problems.

33 Claims, 31 Drawing Sheets

```
>RTRV-INV::SLOT-ALL:301;                                                         1101
<
   NODE 1 1970-01-06 01:55:57
M 301 COMPLD                                                                1107
   1A    2A    3A    4A    5A    6A
   "SLOT-1,DS3N-12:PN=800-06590-03,HWVER=A0,FWVER=76-99-00080-001a,SN=FAA04139D8D,CLEI=NOCLEI"
   "SLOT-2,DS3-12:PN=87-31-00001,HWVER=006E,FWVER=76-99-00007-x02a,SN=002518,CLEI=NOCLEI"       1102
   "SLOT-3,OC12-IR-1:PN=800-06758-03,HWVER=A0,FWVER=76-99-00011-x02a,SN=080015,CLEI=NOCLEI"
   "SLOT-4,OC-12-IR-1:PN=800-06758-03,HWVER=A0,FWVER=76-99-00011-x02a,SN=079770,CLEI=NOCLEI"
   "SLOT-5,OC48-IR-1:PN=87-32-00002,HWVER=005D,FWVER=76-99-00014-x02a,SN=082025,CLEI=NOCLEI"
   "SLOT-6,OC48-IR-1:PN=87-32-00002,HWVER=005D,FWVER=76-99-00014-x02a,SN=082637,CLEI=NOCLEI"
   "SLOT-7,TCC:PN=800-06765-02,HWVER=A0,FWVER=76-99-00072-001a,SN=086026,CLEI=NOCLEI"
   "SLOT-8,XC-VT:PN=800-06588-03,HWVER=A0,FWVER=76-99-00068-004b,SN=FAA04079L8C,CLEI=NOCLEI"
   "SLOT-9,AIC:PN=87-21-00002,HWVER=002F,FWVER=NOT APPLICABLE.SN=029773,CLEI=NOCLEI"
   "SLOT-10,XC-VT:PN=800-06588-03,HWVER=A0,FWVER=76-99-00068-004b,SN=FAA04079L7Z,CLEI=NOCLEI"
   "SLOT-11,TCC:PN=800-06765-02,HWVER=A0,FWVER=76-99-00072-001a,SN=086601,CLEI=NOCLEI"          1109
   "SLOT-12,DS3XM-6:PN=87-31-00019,HWVER=003D,FWVER=76-99-00066-002a,SN=105137,CLEI=NOCLEI"
   "SLOT-13,EC1-12:PN=87-31-00006,HWVER=003F,FWVER=76-99-00067-002a,SN=041344,CLEI=NOCLEI"
   "SLOT-14,E100T-12:PN=800-06747-05,HWVER=A0,FWVER=76-99-00089-002a,SN=120429,CLEI=NOCLEI"
   "SLOT-15,DS1-14:PN=87-31-00005,HWVER=002F,FWVER=76-99-00051-005a,SN=083653,CLEI=NOCLEI"
   "SLOT-16,OC3-IR-4:PN=800-06761-01,HWVER=B0,FWVER=76-99-00009-004a,SN=FAA04229GXC,CLEI=NOCLEI"
   "SLOT-17,OC3-IR-4:PN=87-31-00002,HWVER=P05D,FWVER=76-99-00009-004a,SN=087404,CLEI=NOCLEI"
```

| Index Number | Field Name | Output |
|---|---|---|
| 1A | Slot Number | CER_MA_INV |
| 2A | Card Type | CER_MA_INV |
| 3A | Part Number | CER_MA_INV |
| 4A | Hardware Version | CER_MA_INV |
| 5A | Firmware Version | CER_MA_INV |
| 6A | Serial Number | CER_MA_INV |

(labels: 1104, 1105, 1103)

300

EXECUTIVE SUMMARY SECTION
310

NET AUDIT DETAIL SECTION
320

NET AUDIT TASK LIST SECTION
330

APPENDIX SECTION
340

```
┌─────────────────────────────────────────┐
│  ┌───────────────────────────────────┐  │
│  │  INTRODUCTION TO NETWORK DEVICE AUDIT │  │
│  │              410                  │  │
│  └───────────────────────────────────┘  │
│                                         │
│  ┌───────────────────────────────────┐  │
│  │  NETWORK AUDIT DATA COLLECTION SUMMARY │  │
│  │              420                  │  │
│  └───────────────────────────────────┘  │
│                                         │
│  ┌───────────────────────────────────┐  │
│  │  NETWORK AUDIT DATA COLLECTION GRAPH │  │
│  │              430                  │  │
│  └───────────────────────────────────┘  │
│                                         │
│  ┌───────────────────────────────────┐  │
│  │     NETWORK AUDIT NREP SUMMARY    │  │
│  │              440                  │  │
│  └───────────────────────────────────┘  │
└─────────────────────────────────────────┘
```

FIG. 4A

INTRODUCTION TO: Network Optical Concentrator 15454 Audit.

Optional 15454 network audit provides a convenient identification of the network optical concentrators included in a network and assessment of those network optical concentrators _____. This report assesses the health of these devices according to four network management categories (configuration management, fault management, performance management and capacity management) in a convenient format.

FIG. 4B

| NETWORK AUDIT DATA COLLECTION SUMMARY TABLE | |
|---|---|
| Collection Period | |
| Collection Start Time | |
| Collection Stop Time | |
| Unreachable Nodes | |

FIG. 4C

NETWORK AUDIT NREP SUMMARY

| Status Indicator | Status Identification | Points Assigned |
|---|---|---|
| Warning | Warning indications appear in data tables highlighted in yellow with bolded font. Warning indications mark possible problematic areas and should be investigated. | 1 |
| Critical | Critical indications appear in data tables highlighted in red with bolded font. Critical indications mark conditions that require immediate attention. | 1000 |

NET AUDIT HEALTH: 78%
Note: Net Audit Health % = 100-((Total NREPs/Total Possible NREPs) x 100)

NREP Summary Table
    Critical NREPs: 35,789
    Warning NREPs: 58,897
    Total NREPs: 94,686

NREPs Ratio by Category Graph

Notes:

NODE CORRELATION TABLE

| Node Name | Overall Rank | Performance | | Fault | | Capacity Planning | | Configuration | | Total NREPs | Total Weighted Rank |
|---|---|---|---|---|---|---|---|---|---|---|---|
| | | NREPs | Rank | NREPs | Rank | NREPs | Rank | NREPs | Rank | | |
| | | | | | | | | | | | |
| | | | | | | | | | | | |
| | | | | | | | | | | | |

Configuration Management Section 510
| System 511 |
| Media 512 |
| Protocol 513 |
| Node 514 |

Fault Management Section 520
| System 521 |
| Media 522 |
| Protocol 523 |
| Node 524 |

Performance Management Section 530
| System 531 |
| Media 532 |
| Protocol 533 |
| Node 534 |

Capacity Management Section 540
| System 541 |
| Media 542 |
| Protocol 543 |
| Node 544 |

FIG. 5

SUBIMPACT AREA:
Node:                           Model:                          System NREPs:

600

| Fault | | Performance | | Capacity Planning | | Configuration | |
|---|---|---|---|---|---|---|---|
| Total NREPs | | Total NREPs | | Total NREPs | | Total NREPs | |
| Component Name | Value | Component Name | Value | Component Name | Value | Component Name | Value |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

FIG. 6

Network Element Table

| Network Element Name | IP Address | Node ID | STM Mode | Timing Mode |
|---|---|---|---|---|
| | | | | |
| | | | | |

Board Table

| Network Element Name | Board Name | Slot Name | Part Number | Serial Number | Hardware Version | Firmware Version | Board Status |
|---|---|---|---|---|---|---|---|
| | | | | | | | |
| | | | | | | | |

BITS and Synchronization Reference Table

| Network Element Name | BITS-1 Reference | | BITS-2 Reference | | Synchronization | | |
|---|---|---|---|---|---|---|---|
| | Line code | Framing | Line code | Framing | Primary | Second | Third |
| | | | | | | | |
| | | | | | | | |

Network Element Protection Table 740

| Network Element Name | Working Slot Number | Protection Slot Number | Protection Group | Protection Name | Revertive Mode | Revertive Time (mins) |
|---|---|---|---|---|---|---|
| | | | | | | |
| | | | | | | |

FIG. 7D

Optical Facilities Protection Table 750

| Network Element Name | Working Facility | Protection Facility | Protection Name | Revertive Mode | Revertive Time (mins) | Bi-directional Switch Mode |
|---|---|---|---|---|---|---|
| | | | | | | |
| | | | | | | |

FIG. 7E

Cross Connect Table 760

| Network Element Name | From STS Cross Connect | To STS Cross Connect | Cross Connect Type |
|---|---|---|---|
| | | | |
| | | | |

FIG. 7F

DS1 Service Parameters Table 770

| Network Element Name | Slot Number | Port Number | Line Type | Line Code | Circuit Line Buildout | Primary Service State |
|---|---|---|---|---|---|---|
| | | | | | | |
| | | | | | | |

FIG. 7G

DS3 Service Parameters Table 780

| Network Element Name | Slot Number | Port Number | Line Type | Line Code | Circuit Line Buildout | Primary Service State |
|---|---|---|---|---|---|---|
| | | | | | | |
| | | | | | | |

FIG. 7H

Optical Service Parameters Table 790

| Network Element Name | Facility Slot Number | Port Number | Section DCC Enabled | Timing Source To TCC/TMC Card | Revertive Span Switch Wait To Restore Time | STS Facility For Pointer Justification | Bit Error Ratio For Signal Fail | Bit Error Ratio For Signal Degrade | Mode | Wave length | Protection Group Role | Protection Group Status |
|---|---|---|---|---|---|---|---|---|---|---|---|---|
| | | | | | | | | | | | | |
| | | | | | | | | | | | | |

FIG. 7I

Network Element Field Notice Table 810

| Field Notice Number | Card Type | Hardware Version | Firmware Version | Software Version | Description | Recommendation |
|---|---|---|---|---|---|---|
| | | | | | | |

FIG. 8A

Alarm Status Table 820

| Network Element Name | Board Name | Slot Number | Alarm Status |
|---|---|---|---|
| | | | |

FIG. 8B

Electrical Performance Table Near End

| Network Element Name | Facility | Slot Number | Port Number | Coding Violations | Errored Seconds | Severely Errored Seconds | Severely Errored Frame (A/S) | Unavailable Seconds |
|---|---|---|---|---|---|---|---|---|
| | | | | | | | | |
| | | | | | | | | |

Optical Performance Table Near End

| Network Element Name | Facility | Slot Number | Port Number | Coding Violations | Errored Seconds | Severely Errored Seconds | Unavailable Seconds |
|---|---|---|---|---|---|---|---|
| | | | | | | | |
| | | | | | | | |

Optical Performance Table Far End

| Network Element Name | Facility | Slot Number | Port Number | Coding Violations | Errored Seconds | Severely Errored Seconds | Unavailable Seconds |
|---|---|---|---|---|---|---|---|
| | | | | | | | |
| | | | | | | | |

Network Element Capacity Table 1010

| Network Element Name | Board Name | Slot Number Used | Available Slots |
|---|---|---|---|
| | | | |
| | | | |

FIG. 10A

Net Audit Task List Table 1020

| Node | Field Name | Frequency | Appendix Reference | Engineer / Audit Comments and Net Advice |
|---|---|---|---|---|
| | | | | |
| | | | | |
| | | | | |
| | | | | |
| | | | | |
| | | | | |

FIG. 10B

Appendix D - Device Unreachable Table

| Host name of IP Address | Iteration 1 Reason of Failure | Iteration 2 Reason for Failure |
|---|---|---|
| Router I | PASS | router |
| Router I | PASS | C2900 |

The Failure Type is one of the following:

Duplicated_Fail
  Device in the list more than once and data was unsuccessfully collected.

Duplicated_Pass
  Device in the list more than once and data was successfully collected.

FAIL
  Device either had unknown IDs or passwords, or could not be reached due to network problems.

Not Used
  Device was in the initial audit request but was not in the device list at the time of the collection Switch
  Device is a 29xx switch, not a router. NATkit will be corrected in the future to properly classify the 29xx switches, so that they do not appear in the Router Stability Net Audit.

Incomplete Command Set
  During the data collection, one or more commands were not retrieved from the router, most likely because the connection between the NATkit and the router failed.

```
>RTRV-INV::SLOT-ALL:301;
<
   NODE 1 1970-01-06 01:55:57
M 301 COMPLD
   1A     2A       3A                    4A           5A                              6A
"SLOT-1,DS3N-12:PN=800-06590-03,HWVER=A0,FWVER=76-99-00080-001a,SN=FAA04139D8D,CLEI=NOCLEI"
"SLOT-2,DS3-12:PN=87-31-00001,HWVER=006E,FWVER=76-99-00007-x02a,SN=002518,CLEI=NOCLEI"
"SLOT-3,OC12-IR-1:PN=800-06758-03,HWVER=A0,FWVER=76-99-00011-x02a,SN=080015,CLEI=NOCLEI"
"SLOT-4,OC-12-IR-1:PN=800-06758-03,HWVER=A0,FWVER=76-99-00011-x02a,SN=079770,CLEI=NOCLEI"
"SLOT-5,OC48-IR-1:PN=87-32-00002,HWVER=005D,FWVER=76-99-00014-x02a,SN=082025,CLEI=NOCLEI"
"SLOT-6,OC48-IR-1:PN=87-32-00002,HWVER=005D,FWVER=76-99-00014-x02a,SN=082637,CLEI=NOCLEI"
"SLOT-7,TCC:PN=800-06765-02,HWVER=A0,FWVER=76-99-00072-001a,SN=086026,CLEI=NOCLEI"
"SLOT-8,XC-VT:PN=800-06588-03,HWVER=A0,FWVER=76-99-00068-004b,SN=FAA04079L8C,CLEI=NOCLEI"
"SLOT-9,AIC:PN=87-21-00002,HWVER=002F,FWVER=NOT APPLICABLE,SN=029773,CLEI=NOCLEI"
"SLOT-10,XC-VT:PN=800-06588-03,HWVER=A0,FWVER=76-99-00068-004b,SN=FAA04079L7Z,CLEI=NOCLEI"
"SLOT-11,TCC:PN=800-06765-02,HWVER=A0,FWVER=76-99-00072-001a,SN=086601,CLEI=NOCLEI"
"SLOT-12,DS3XM-6:PN=87-31-00019,HWVER=003D,FWVER=76-99-00066-002a,SN=105137,CLEI=NOCLEI"
"SLOT-13,EC1-12:PN=87-31-00006,HWVER=003F,FWVER=76-99-00067-002a,SN=041344,CLEI=NOCLEI"
"SLOT-14,E100T-12:PN=800-06747-05,HWVER=A0,FWVER=76-99-00089-002a,SN=120429,CLEI=NOCLEI"
"SLOT-15,DS1-14:PN=87-31-00005,HWVER=002F,FWVER=76-99-00051-005a,SN=083653,CLEI=NOCLEI"
"SLOT-16,OC3-IR-4:PN=800-06761-01,HWVER=B0,FWVER=76-99-00009-004a,SN=FAA04229GXC,CLEI=NOCLEI"
"SLOT-17,OC3-IR-4:PN=87-31-00002,HWVER=P05D,FWVER=76-99-00009-004a,SN=087404,CLEI=NOCLEI"
```

| Index Number | Field Name       | Output     |
|--------------|------------------|------------|
| 1A           | Slot Number      | CER_MA_INV |
| 2A           | Card Type        | CER_MA_INV |
| 3A           | Part Number      | CER_MA_INV |
| 4A           | Hardware Version | CER_MA_INV |
| 5A           | Firmware Version | CER_MA_INV |
| 6A           | Serial Number    | CER_MA_INV |

FIG. 11A

```
>RTRV-PM-OC48=FAC-5-ALL:123::.....15MIN:                                    1111
<

NODE 3 1970-01-02 18:04:02
M 123 COMPLD
     1H      2H
   "FAC-5-1:SEFS,6,COMPL,NEND,15MIN,BTH.."
           3H
   "FAC-5-1:CVL,0,COMP,NEND,15MIN,BTH.."
           4H
   "FAC-5-1:ESL,6,COMPL,NEND,15MIN,BTH.."
           5H
   "FAC-5-1:SESL,6,COMPL,NEND,15MIN,BTH.."
           6H
   "FAC-5-1:UASL,0,COMPL,NEND,15MIN,BTH.."
           7H
   "FAC-5-1:FCL,1,COMPL,NEND,15MIN,BTH.."
           8H
   "FAC-5-1:NPJC-PDET,0,COMPL,NEND,15MIN,RCV.."
           9H
   "FAC-5-1:PPJC-PDET,0,COMPL,NEND,15MIN,RCV.."
          10H
   "FAC-5-1:NPJC-PGEN,0,COMPL,NEND,15MIN,TRUT.."         1112
          11H
   "FAC-5-1:PPJC-PGEN,0,COMPL,NEND,15MIN,TRUT.."
          12H
   "FAC-5-1:CVL,0,COMPL,FEND,15MIN,BTH.."
          13H
   "FAC-5-1:ESL,0,COMPL,FEND,15MIN,BTH.."
          14H
   "FAC-5-1:SESL,0,COMPL,FEND,15MIN,BTH.."
          15H
   "FAC-5-1:JASL,0,COMPL,FEND,15MIN,BTH.."
          16H
   "FAC-5-1:FCL,0,COMPL,FEND,15MIN,BTH.."
```

| Index Number | Field Name | Output |
|---|---|---|
| 1H | Factory | CER_MA_PM_OP |
| 2H | SEFS_NEND | CER_MA_PM_OP |
| 3H | CVL_NEND | CER_MA_PM_OP |
| 4H | ESL_NEND | CER_MA_PM_OP |
| 5H | SESL_NEND | CER_MA_PM_OP |
| 6H | UASL_NEND | CER_MA_PM_OP |
| 7H | FCL_NEND | CER_MA_PM_OP |
| 8H | NPJC_RCV | CER_MA_PM_OP |
| 9H | PPJC_RCV | CER_MA_PM_OP |
| 10H | NPJC_TRMT | CER_MA_PM_OP |
| 11H | PPJC_TRMT | CER_MA_PM_OP |
| 12H | CVL_FEND | CER_MA_PM_OP |
| 13H | ESL_FEND | CER_MA_PM_OP |
| 14H | SESL_FEND | CER_MA_PM_OP |
| 15H | UASL_FEND | CER_MA_PM_OP |
| 16H | FCL_FEND | CER_MA_PM_OP |

| Optical Performance Table - Far End | | | | | | | |
|---|---|---|---|---|---|---|---|
| Network Element Name | Facility | Slot Number | Port Number | Coding Violations | Errored Seconds | Severely Errored Seconds | Unavailable Seconds |
| | CER_MA _INV _Index 2A | CER_MA _PM_OP _Index 1H | CER_MA _PM_OP _Index 1H | CER_MA_PM_OP | CER_MA _PM_OP _Index 13H | CER_MA _PM_OP _Index 14H | CER_MA _PM_OP _Index 15H |
| | | | | Index 12H | | | |
| NODE 1 | OC-48 | 5 | 1 | 1 | 1 | 1 | 1 |
| | | | | OC3 interfaces If the number exceeds 1312 for a 15 min. interval or exceeds 13,120 for a 1 day interval, flag RED. OC12 interfaces If the number exceeds 5315 for a 15 min. interval or exceeds 53,250 for a 1 day interval, flag RED. OC48 interfaces 21,260 for a 15 min. interval or exceeds 212,600 for a 1 day interval, flag RED. | If the number exceeds 87 for a 15 min. interval or exceeds 864 for a 1 day interval, flag RED | If the number exceeds 1 for a 15 min. interval or exceeds 4 for a 1 day interval, flag RED | If the number exceeds 3 for a 15 min. interval or exceeds 10 for a 1 day interval, flag RED |

Arrows indicate 1131, 1132, 1133 pointing to the Coding Violations, Errored Seconds, and Unavailable Seconds columns.

FIG. 11C

| COMMAND | RETRIEVED INFORMATION |
|---|---|
| RTRV-INV::SLOT-xxx:yyy; | Slot number, Card Type, Part Number, Hardware Version, Firmware Version, and Serial Number. |
| RTRV-NE:::; | Internet Protocol (IP) Address, Synchronous Transfer Mode, Node Identification (ID), and Timing Mode. |
| RTRV-EQPT::SLOT-xxx:yyy; | Slot Number, Card Type, and Card Status. |
| RTRV-BITS::BITS-NE:xxx:yyy; | BITS Reference Number, Line Coding, and Frame Format. |
| RTRV_SYNC::SYNC-NE:xxx:yyy; | Synchronization Sources such a First Primary Synchronization Source, Second Synchronization Source, and a Third Synchronization Source. |
| RTRV_ALM-ALL:::yyy; | Alarms and associated Slot Numbers. |
| RTRV-TOD:::yyy; | Time of Day |
| RTRV-PM-OCvv:: FAC-xxx-ALL:yyy::,,,,zzz,,; | Facility and Near End and Far End performance such as transmission and reception Severely Errored Framing Second (SEFS), Line Coding Violation (CVL), Line Errored Second (ESL), Line Severely Errored Second (SESL), Path Unavailable (UASP), Path Coding Violation (CVP), Path Second Errored Second (ESP), and Path Severely Errored Second (SESP). Transmission and reception NPJC and PPJC information. |
| RTRV-PM-TI: FAC-xxx-ALL:yyy::,,,,zzz,,: | Facility and Near End performance such as transmission and reception Severely Errored Framing Second (SEFS), Line Coding Violation (CVL), Line Errored Second (ESL), Line Severely Errored Second (SESL), Line Unavailable Second (UASL) and Line Failure Count (FCL). Transmission and reception NPJC and PPJC information. |
| RTRV-OCvv:: FAC-xxx-ALL:yyy::,,,,zzz,,; | Facility, Section DCC Enabled, Timing Source for TCC/TMG Card, Span Switch Wait to Restore Time, STA Monitored Facility for Pointer Justifications, Signal Failure Bit Error Ratio, Signal Degrade Bit Error Ratio Threshold, Facility state, Protection Group Role, and Protection Croup Status |
| RTRV-T3:CERENT:FAC-xxx-y:zzz:::; or RTRV-T1:TID:FAC-vv-uu:yyyy; | Facility, Line Type, Line Coding, Line Buildout, and Primary Service State. |
| RTRV-FFP-EQPT::SLOT-vv:yyy; | Working Slot Number, Protection Slot Number, Protection Group, Protection name, Revertive Mode, and Revertive Time. |

FIG. 11D

| Net Rule | Heading | Description |
|---|---|---|
| OC3 Interfaces<br>If the number exceeds 1312 for a 15 min. interval or exceeds 13,120 for a 1-day interval<br>OC12 Interfaces<br>If the number exceeds 5315 for a 15 min. interval or exceeds 53,250 for a 1-day interval<br>OC48 Interfaces<br>If the number exceeds 21,260 for a 15 min. interval or exceeds 212,600 for a 1-day interval | Optical Performance Table Near and Far end coding Violations | For OC3 Interfaces<br>If the number exceeds 1312 for a 15 min. interval or exceeds 13,120 for a 1-day interval are bolded red<br>For OC12 Interfaces<br>If the number exceeds 5315 for a 15 min. interval or exceeds 53,250 for a 1-day interval are bolded red<br>For OC48 Interfaces<br>If the number exceeds 21,260 for a 15 min. interval or exceeds 212,600 for a 1-day interval are bolded red |
| DS1 Interfaces<br>If the number exceeds 13,340 for a 15 min. interval or exceeds 133,400 for a 1-day interval<br>DS-3 Interfaces<br>If the number exceeds 387 for a 15 min. interval or exceeds 3865 for a 1-day interval<br>EC-1 Interfaces<br>If the number exceeds 1312 for a 15 min. interval or exceeds 13,120 for a 1-day interval<br>DS3XM-6 Interfaces<br>If the number exceeds 387 for a 15 min. interval or exceeds 3865 for a 1-day interval | Electrical Performance Near End Table Coding Violations | For DS1 Interfaces<br>If the number exceeds 13,340 for a 15 min. interval or exceeds 133,400 for a 1-day interval are bolded red.<br>For DS-3 Interfaces<br>If the number exceeds 387 for a 15 min. interval or exceeds 3865 for a 1-day interval are bolded red.<br>For EC-1 Interfaces<br>If the number exceeds 1312 for a 15 min. interval or exceeds 13,120 for a 1-day interval are bolded red.<br>For DS3XM-6 Interfaces<br>If the number exceeds 387 for a 15 min. interval or exceeds 3865 for a 1-day interval are bolded red. |

Fig. 11E

| | | |
|---|---|---|
| If the number exceeds 87 for a 15 min. interval or exceeds 864 for a 1-day interval | Optical Performance Table Near and Far end Errored Seconds | If the number exceeds 87 for a 15 min. interval or exceeds 864 for a 1-day interval are bolded red |
| DS1 Interfaces<br>If the number exceeds 65 for a 15 min. interval or exceeds 648 for a 1-day interval<br>DS-3 Interfaces<br>If the number exceeds 25 for a 15 min. interval or exceeds 250 for a 1-day interval<br>EC-1 Interfaces<br>If the number exceeds 87 for a 15 min. interval or exceeds 864 for a 1-day interval<br>DS3XM-6 Interfaces<br>If the number exceeds 25 for a 15 min. interval or exceeds 250 for a 1-day interval | Electrical Performance Near End Table Errored Seconds | For DS1 Interfaces<br>If the number exceeds 65 for a 15 min. interval or exceeds 648 for a 1-day interval are bolded red<br>DS-3 Interfaces.<br>For DS-3 Interfaces<br>If the number exceeds 25 for a 15 min. interval or exceeds 250 for a 1-day interval are bolded red.<br>For EC-1 Interfaces<br>If the number exceeds 87 for a 15 min. interval or exceeds 864 for a 1-day interval are bolded red.<br>For DS3XM-6 Interfaces<br>If the number exceeds 25 for a 15 min. interval or exceeds 250 for a 1-day interval are bolded red. |

Fig. 11E (Continued)

| Net Rule | Heading | Description |
|---|---|---|
| DS1 Interfaces<br>If the number exceeds 10 for a 15 min. interval or exceeds 10 for a 1-day interval<br>OS3 Interfaces<br>If the number exceeds 10 for a 15 min. interval or exceeds 10 for a 1-day interval<br>EC1 Interfaces<br>If the number exceeds 10 for a 15 min. interval or exceeds 10 for a 1-day interval<br>DS3XM-6 Interfaces<br>If the number exceeds 10 for a 15 min. interval or exceeds 10 for a 1-day interval | Severely Errored Frame (AIS) | For DS1 Interfaces<br>If the number exceeds 10 for an 15 min. interval or exceeds 10 for a 1-day interval are bolded red.<br>For DS-3 Interfeces<br>If the number exceeds 10 for a 15 min. interval or exceeds 10 for a 1-day interval are bolded red.<br>For EC-1 Interfaces<br>If the number exceeds 10 for a 15 min. interval or exceeds 10 for a 1-day interval are bolded red.<br>For DS3XM-6 Interfaces<br>If the number exceeds 10 for a 15 min. interval or exceeds 10 for a 1-day interval are bolded red. |
| If the number exceeds 1 for a 15 min. interval or exceeds 4 for a 1-day interval | Optical Performance Table Near and Far end Severely Errored Seconds | If the number exceeds 1 for a 15 min. interval or exceeds 4 for a 1-day interval are bolded red. |

Fig. 11F

| | | |
|---|---|---|
| DS1 Interfaces<br>If the number exceeds 10 for a 15 min. interval or exceeds 100 for a 1-day interval<br>DS-3 Interfaces<br>If the number exceeds 4 for a 15 min. interval or exceeds 40 for a 1-day interval<br>EC-1 Interfaces<br>If the number exceeds 1 for a 15 min. interval or exceeds 4 for a 1-day interval<br>DS3XM-6 Interfaces<br>If the number exceeds 4 for a 15 min. interval or exceeds 40 for a 1-day interval | Electrical Performance Near End Table Severely Errored Seconds | For DS1 Interfaces<br>If the number exceeds 10 for a 15 min. interval or exceeds 100 for a 1-day interval are bolded red.<br>For DS-3 Interfaces<br>If the number exceeds 4 for a 15 min. interval or exceeds 40 for a 1-day interval are bolded red.<br>For EC-1 Interfaces<br>If the number exceeds 1 for a 15 min. interval or exceeds 4 for a 1-day interval are bolded red.<br>For DS3XM-6 Interfaces<br>If the number exceeds 4 for a 15 min. interval or exceeds 40 for a 1-day interval are bolded red. |
| | Slot Number | Displays Slot Number |

Fig. 11F (Continued)

| | | |
|---|---|---|
| DS1 Interfaces | Electrical Performance Near End Table Unavailable Seconds | For DS1 Interfaces |
| If the number exceeds 3 for a 15 min. interval or exceeds 10 for a 1-day interval | | If the number exceeds 3 for a 15 min. interval or exceeds 10 for a 1-day interval are bolded red. |
| DS-3 Interfaces | | For DS-3 Interfaces |
| If the number exceeds 3 for a 15 min. interval or exceeds 10 for a 1-day interval | | If the number exceeds 3 for a 15 min. interval or exceeds 10 for a 1-day interval are bolded red. |
| EC-1 Interfaces | | For EC-1 Interfaces |
| If the number exceeds 3 for a 15 min. interval or exceeds 10 for a 1-day interval | | If the number exceeds 3 for a 15 min. interval or exceeds 10 for a 1-day interval are bolded red. |
| DS3XM-6 Interfaces | | For DS3XM-6 Interfaces |
| If the number exceeds 10 for a 15 min. interval or exceeds 10 for a 1-day interval | | If the number exceeds 10 for a 15 min. interval or exceeds 10 for a 1-day interval are bolded red. |
| If the number exceeds 3 for a 15 min. interval or exceeds 10 for a 1-day interval | Optical Performance Table Near and Far end Unavailable Seconds | If the number exceeds 3 for a 15 min. interval or exceeds 10 for a 1-day interval are bolded red |

Fig. 11F (Continued)

| Field Notice Number | Card Type | Hardware Version | Firmware Version | Software Version | Description | Recommendation |
|---|---|---|---|---|---|---|
| 12851 | E100T | 800-06747-05 A0 or prior | N/A | N/A | Incorrect coding in C2 byte of optical backbone facility. All version of the E100T card prior to 800-06747-05 A0 will require a hardware upgrade to support features introduced in version 2.2 CTC (Cisco Transport Controller) and later | Old revision boards will not operate with CTC 2.2. It is important to understand that without the upgraded cards Ethernet traffic will not operate using CTC 2.2<br>If you need additional technical assistance, please call the Cisco Technical Assistance Center at (877) 323-7368 |
| 19 | OC12 Cards | 800-06758-01 A0<br>800-06759-01 A0<br>800-06760-01 A0 | N/A | N/A | Bit errors may be seen on an OC-12 card when the incoming line frequency is less than the NE's internal; clock by more than 4ppm. This can happen as a result of synchronization problems in the network, or if the node is operating in free running synchronous node. Bit errors may be seen when synchronization timing references drift off frequency by 4ppm or more, or when networks are configured to free running synchronous mode. | This issue has been corrected in the current release of all OC-12 cards (Part # 800-06758-02, 800-06759-02, 800-06760-02) and all subsequent versions.<br>If you need additional technical assistance, please call the Cisco Technical Assistance Center at (877) 323-7368 |

FIG. 12

| 12652 | TCC card | Serial number ranges of 31550 and 45500 and FAA04280001 through FAA0430A4BA | N/A | N/A | While performing a software upgrade to specific TCCs or activating software on specific TCCs these processes may fail. Additional failure symptoms could include unexplained resets of the TCC. | Screen each node to determine if these defective TCCs are present and replace them if they are identified to contain the defective component. If you need additional technical assistance, please call the Cisco Technical Assistance Center at (877) 323-7368 |

FIG. 12 (Continued)

Net Audit Version 4

| Command | Key Variable(s) | Section | Sub Section | MIB (If applicable) | Poll Freq | Net Info | Net Advice | Net Advisor Include? |
|---|---|---|---|---|---|---|---|---|
| RTRV-OC48::FAC-6-1:236; | | Performance Cofiguration Fault | System Media | | hourly | Bit Error Ratio For Signal Fail - the default value is 1E-4. It has been determined that your value is something other than the default. BIT Error Ratio For Signal Degrade - the default value is 1E-7. It has been determined that your value is something other than the default. | Verify the current value set and investigate why it has changed from default. In some networks, tuning is advantageous and values other than default are acceptable. | ✓ |
| RTRV-TC3:CERENT:FAC-1-2:123::::; | | Performance Cofiguration Fault | System Media | | hourly | Line type - the default value for all DS and EC interfaces except the DS3XM-6 is D4. The default value for the DS3XM-6 is C Bit. It has been determined that your value is something other than the default. Line Code - the default value for all DS and EC interfaces except the DS3XM-6 is AMI. The default value for the DS3XM-6 interface is B3ZS. It has been determined that your value is something other than the default. | Verify the current value set and investigate why it has changed from default. In some networks, tuning is advantageous and values other than default are acceptable | ✓ |

| | | | | | |
|---|---|---|---|---|---|
| RTRV-T1:TID: FAC-2-1:1223:::: | Perform ance Cofigur ation Fault | System Media | hourly | Circuit Line Buildout - the default value for DS-1 interfaces is 0-131. The default value for EC-1 and DS-3 interfaces is 0-255. The default value for the EC1-12 interface is 0-255. It has been determined that your value is something other than the default. Line type - the default value for all DS and EC interfaces except the DS3XM-6 is D4. The default value for the DS3XM-6 is C Bit. It has been determined that your value is something other than the default. Line Code - the default value for all DS and EC interfaces except the DS3XM-6 is AMI. The default value for the DS3XM-6 interface is B3ZS. It has been determined that your value is something other than the default. Circuit Line Buildout - the default value for DS-1 interfaces is 0-131. The default value for EC-1 and DS-3 interfaces is 0-255. The default value for the EC1-12 interface is 0-255. It has been determined that your value is something other than the default. | Verify the current value set and investigate why it has changed from default. In some networks, tuning is advantageous and values other than default are acceptable ✓ |

OPTICAL TRANSPORT CONCENTRATOR AUDIT SYSTEM AND METHOD

FIELD OF THE INVENTION

This invention relates to the field of communication networks. In particular, the present invention relates to auditing an optical concentrator and presenting the results in a convenient user friendly manner.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Often these advantageous results are achieved through the use of distributed resources that communicate with each other over a network. To obtain maximized performance from distributed resources it is usually critical for the communication devices to be maintained at performance levels that support rapid and reliable communication of information. Advances in the performance capabilities of modern network communications are increasing the demand for efficient and network management and maintenance operations capable of addressing complicated troubleshooting problems.

Tremendous growth in communication traffic due to a seemingly insatiable desire for new services has led to an increased an demand for large bandwidth capabilities and is driving the rapid deployment of advance communication networks. New optical networking is one example of advanced technologies that can efficiently support the exponential growth of data traffic through high performance bandwidth capabilities. Bandwidth is the rate at which information is communicated over a network. To support greater bandwidth and communication speed, modern communications systems utilizing advanced communication technology require communication devices to operate properly. The communication devices included in advanced networks are often complicated and sophisticated devices and to ensure information is communicated reliably, the communication devices usually have to operate within relatively stringent performance parameters. For example, communications over an optical network typically involves complicated engineering principals beyond the grasp of an average user. The complexities of advanced devices increase the difficulty in understanding how they are configured and operate. Network management and maintenance techniques directed to examining the operation of the communication devices are often very complicated and consume significant resources.

Due to the complicated nature of the devices included in an advanced communications network, the technicians performing the troubleshooting are usually required to be highly skilled and experienced technicians. It takes a significant number of years to become highly skilled and experienced in the design and operations of devices included in a single communication network architecture. Advanced communications network device maintenance and management operations typically involve complicated protocols with obscure precise codes that are syntax sensitive and produce obfuscated data results presented in complicated formats. Manual entry of the precise codes and reading of the obfuscated data often results in errors. Even if the codes are entered correctly and the data is read correctly, viable network management and maintenance requires accurate interpretation, thoughtful analysis and insightful recommendations. In addition to solving existing problems a network communication device is experiencing, it is even more advantageous to have information on potential problems so that preventive measures can be taken to avoid loss of bandwidth capabilities. It usually takes significant resource expenditure to obtain the expertise required to provide network maintenance that addresses existing and potential communication device problems.

Communications networks typically involve large numbers of devices and information is often communicated over a number of different architectures and platforms. Each architecture usually encompasses a variety of devices each with unique auditing scenarios. The vast number of different devices that are potentially involved in communicating data over a network dramatically increases the knowledge and expertise and exponentially increases the difficulty of managing and maintaining network communication devices. It is particularly troublesome and very expensive to perform management and maintenance audits of all the different communications devices that are typically included in a modern communications network.

Accordingly, what is required is a system and method that facilitates audits of network communication devices and presents results in a convenient and user friendly format.

SUMMARY

The present invention is a system and method that facilitates audits of network device performance and presents results in a convenient and user friendly format. The present invention network device audit system and method provides audits of communication devices included in a communications network. In one embodiment, the present invention provides a system and method for auditing the characteristics and operations of a optical network concentrator. The communication device audit system and method efficiently and accurately assists management and maintenance operations for advanced network communication devices and provides a valuable proactive resource for end users.

A present invention automated network communication device audit tool interacts with other communication devices in a network, analyzes the condition and performance of the other communication devices, and reports the results in a convenient format. The present invention network communication device audit tool system and method automates the arduous process of gathering, parsing, analyzing, and organizing information required to create network communication device audit reports. In one embodiment, the present invention utilizes backend intelligence to discover and analyze problems with network communication devices and provides recommendations for potential solutions or corrective courses of action. In one exemplary implementation of the present invention, a communication network device audit report provides information in a plain descriptive manner that facilitates easy understanding of the capabilities and problems of a communication network device. The communication network device audit reports the information in a similar look and feel format for a variety of communication devices from different architectures and protocols. For example, a present invention automated network communication device audit system and method audits the performance of an optical transport concentrator and provides an audit report that facilitates management and maintenance.

DESCRIPTION OF THE DRAWINGS

FIG. 3 is a block diagram illustration of one embodiment of a present invention network communication device audit report.

FIG. 4A is an illustration of an automated network communication device audit report executive summary section included in one embodiment of the present invention.

FIG. 4B is an illustration of one exemplary implementation of an introduction to network device audit section included in one embodiment of the present invention.

FIG. 4C is an illustration of a exemplary implementation of a present invention network audit data collection summary section.

FIG. 4E is an illustration of one exemplary implementation of network audit data collection graph section included in one embodiment of the present invention.

FIG. 5 is an illustration of a net audit detail section of one embodiment of the present invention.

FIG. 6 is an illustration of a subimpact area net audit detail summary table included in one embodiment of a present invention.

FIG. 7A is an illustration of a network element table included in one embodiment of the present invention for an optical concentrator.

FIG. 7B is an illustration of an exemplary present invention board table.

FIG. 7C is an illustration of a bits and synchronization reference table included in one exemplary implementation of the present invention.

FIG. 7D is an illustration of a network element protection table included in one embodiment of the present invention.

FIG. 7E is an illustration of one embodiment of a present invention optical facilities protection table.

FIG. 7F is an illustration of a cross connect table included in one embodiment of the present invention.

FIG. 7G is an illustration of a present invention exemplary DS1 service parameters table.

FIG. 7H is an illustration of a DS3 service parameters table included in one exemplary implementation of the present invention.

FIG. 7I is an illustration of an optical service parameter table included in one embodiment of the present invention.

FIG. 8A is an illustration of a network element field notice table included in one embodiment of the present invention.

FIG. 8B is an illustration of an alarm status table included in one embodiment of the present invention.

FIG. 9A is an illustration of electrical performance near end table included in one embodiment of the present invention.

FIG. 9B is an illustration of one exemplary implementation of a present invention optical performance far end table.

FIG. 9C is an illustration of one embodiment of a present invention optical performance table.

FIG. 10A is an illustration of a capacity planning table included in one embodiment of the present invention.

FIG. 10B is an illustration of one embodiment of a present invention network communication device audit task list.

FIG. 10C is an illustration of one embodiment of a present invention device unreachable table.

FIG. 11A is a block diagram illustration of exemplary commands, retrieved network element information and guidelines for interpreting the retrieved information included in one exemplary implementation of the present invention.

FIG. 11B is a block diagram illustration of one embodiment of present invention exemplary commands, retrieved network element information and guidelines for interpreting the retrieved information.

FIG. 11C is a block diagram illustration of a partially populated exemplary far end optical performance table utilizing the correlation provided by the index correlation information.

FIG. 11E is a tabular illustration of network rules utilized in one exemplary implementation of the present invention.

FIG. 11F is a tabular illustration of network rules utilized in one exemplary implementation of the present invention.

FIG. 12 is one exemplary implementation of a present invention network element field notice table with corrective advice.

FIG. 13 is one exemplary implementation of a present invention table included in an appendix with information on commands, impact areas, polling frequency, rule information, potential causes of a problem and suggested corrective measures.

DETAILED DESCRIPTION

Reference will now be made in detail to the preferred embodiments of the invention, an automated network communication device audit system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is an automated network communication device audit system and method that facilitates efficient and effective network resource management and maintenance. A present invention automated network communication device audit tool interacts with other communication devices in a network, analyzes the condition and performance of the other communication devices, and reports the results in a convenient format. The present invention utilizes a backend intelligence to discover and analyze problems with devices included in a communication network and to provide recommendations for potential solutions or corrective courses of action. In one exemplary implementation of the present invention, a communication network device audit report provides information in a plain descriptive manner that facilitates easy understanding of the communication device capabilities and problems the communication device is exhibiting. For example, a present invention automated network communication device audit system and method automatically performs an optical transport concentrator audit and provides an audit report that assists network communication device management and maintenance activities.

Figure 1:
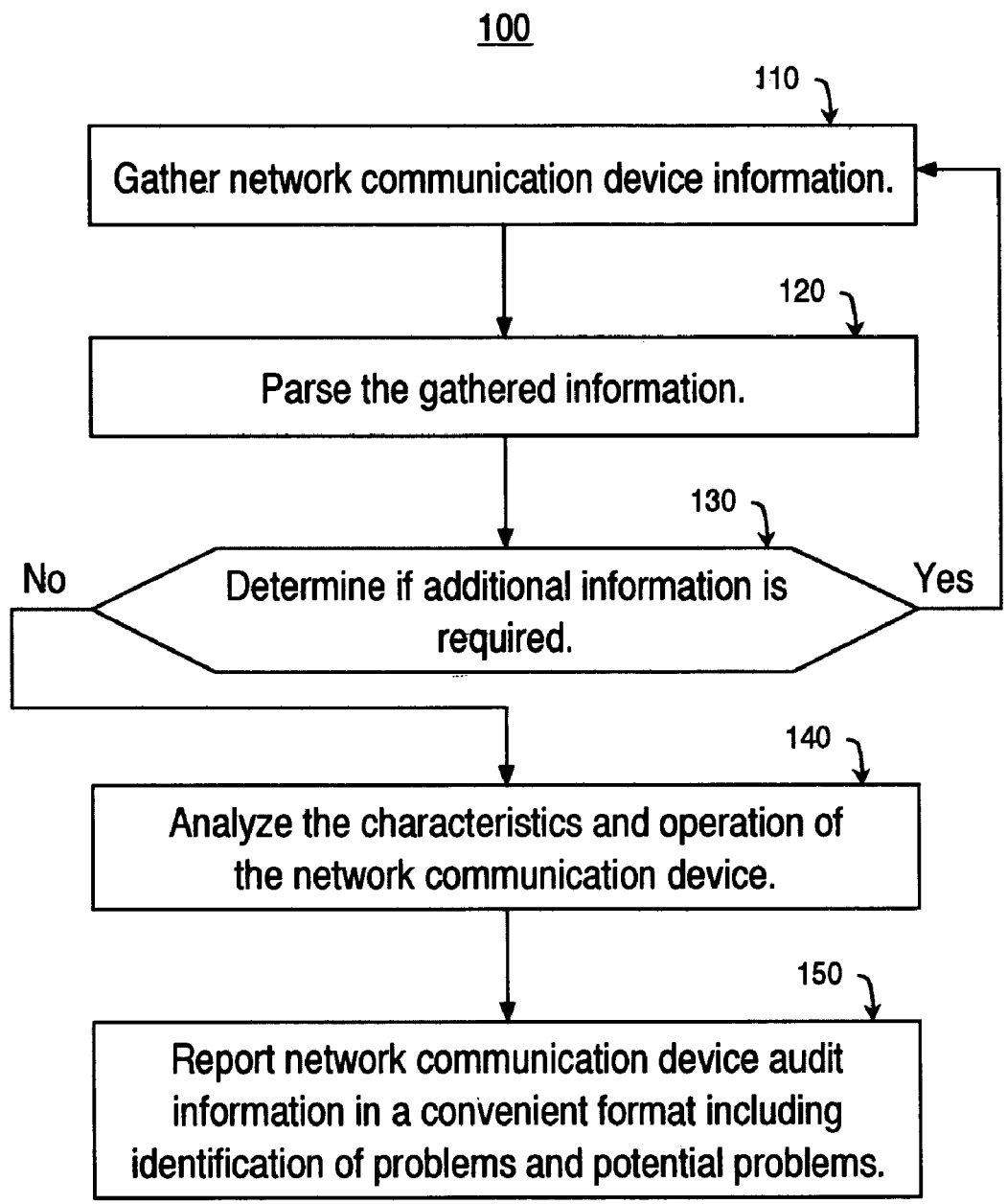
FIG. 1 is an illustration of a flow chart of an automated network communication device audit tool method, one embodiment of the present invention.
Figure 11D:
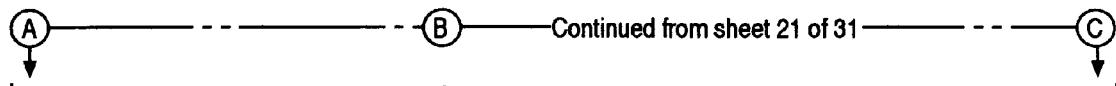
FIG. 11D is a table of network audit commands utilized in one embodiment of the present invention to retrieve information from an optical concentrator.

FIG. 1 is a flow chart of automated network communication device audit tool method 100, one embodiment of the present invention. In one embodiment of the present invention, automated network communication device audit tool method 100 is implemented on a computer system. In one exemplary implementation of the present invention, communication device information such as configuration, performance and functionality information is audited. Automated network communication device audit tool method 100 automates the arduous process of gathering, parsing, analyzing, and organizing communication network device information. configuration, performance and functionality information In step 110, network communication device information is gathered. In one embodiment of the present invention, information indicating the types of devices included in a network and their status is retrieved. In one embodiment of the present invention, automated network communication device audit tool method 100 performs a network communication device query process that automatically queries the communication devices included in a network to obtain information of the device characteristics and operation. In one exemplary implementation of the present invention, automated network communication device audit tool method 200 automatically constructs the queries by issuing protocol commands formatted in the appropriate syntax for the communication devices included in the network. FIG. 11D is a table of network audit commands utilized in one embodiment of the present invention to retrieve information from an optical concentrator. The information is gathered at predetermined intervals in accordance with a polling frequency or upon a triggering event (e.g., return from a network shutdown, operator command, etc.)

In step 120 the gathered information is parsed. In one embodiment of the present invention, automated network communication device audit tool method 100 automatically performs a parsing process that identifies portions of information retrieved in step 110 and correlates it to a operation or characteristic of the device. In one embodiment, a present invention utilizes an intelligent backend to parse the information. For example, the intelligent backend includes information correlating the format of retrieved information to configuration, performance and functionality characteristics of the network communications device. In one exemplary implementation of the present invention, the intelligent backend is capable of recognizing character strings included in the gathered information and associating the character strings with a communication device characteristic. For example, a present invention network communications device audit intelligent backend is capable of recognizing that the character string HWVER=A0 included in information gathered in response to a >RTRV_INV::SLOT_ALL: 301;< command indicates the hardware version is A0.

In step 130, automated network communication device audit tool method 100 determines if additional information is required. In one embodiment of the present invention, automated network communication device audit tool method 100 utilizes an intelligent backend to examine the information gathered in step 110 and ascertains if more detailed or precise information is required to perform the audit. For example, sufficient information to populate network audit report tables associated with the type of communication device being audited. In one exemplary implementation, the present invention network communications device audit intelligent backend includes information that draws a correlation between gathered information and additional requisite information. For example based upon some particular retrieved information (e.g., a type of card or slot included in a communication device such as an OC3 card) the intelligent backend requests additional information directed at that type of card (optical performance characteristics such as errored seconds of the OC3 card). If additional information is required, automated network communication device audit tool method 100 returns to step 110 and performs additional information gathering based upon the requirements indicated by the intelligent backend. If additional information is not requested automated network communication device audit tool method 100 proceeds to step 140.

In one embodiment of a present invention implemented on a network comprising optical concentrators, information associated with the optical concentrators is gathered. For example, once automated network communication device audit tool method 100 determines the identity of the optical concentrators it forwards an iterative series of increasingly detailed queries. For example, automated network communication device audit tool method 100 forward commands directed to asking what cards are in which slots, what hardware version each card is, what software version are the cards are running, and what is the status of each card (e.g., is it working, in backup mode, not on, etc.). For each DS1 card or OC card identified in an optical concentrator the present invention asks each port on the DS1 card are there any coding violations, are there any errored seconds, any severely errored seconds, and any severely error frames. The present invention is intelligent enough to form queries for different types of cards. For example, for each DS3 card identified, the present invention asks each port on the DS3 card what is the line type, the line code and the circuit build out.

In step 140 the characteristics and operation of communication devices included in a network are analyzed. In one embodiment of the present invention, an automated network communication device audit analysis process is utilized to analyze the configuration, functionality and performance of communication devices included in a communication network. In one exemplary implementation of the present invention, an expert network communications device audit intelligent backend compares the parsed information to values included in an expert network audit database. The values in the expert network audit database include threshold parameters that indicate acceptable characteristics, performance and functionality. Automated network communication device audit tool method 100 identifies if gathered information is within the threshold parameters.

In step 150, network communication device audit information is reported in a convenient manner including identification of existing and potential problems. In one embodiment of the present invention, the network communication device audit information includes device configuration information, functionality information, performance level information, and identification of parameters that do not meet threshold levels. In one embodiment of the present invention, the network communication device audit report has the same look and feel for a variety of communication devices across different architectures and is organized in a manner that facilitates network management and maintenance.

In one exemplary implementation of the present invention, a present network device exemplary audit network report presents information associated with different areas that impact network management operations. For example, assessment of the health of a communication device is presented from network management operations impact areas such as fault management, performance management, configuration management, and capacity management. The fault management section provides information on faults (e.g., field notices). The performance management section includes information on operational problems (e.g., errored seconds). The configuration management section includes information of the components included in a node of a network element (e.g., a card part number). The capacity management section provides information expansion potential (e.g., slots available for additional cards). In one embodiment of the present invention, the impact areas are further broken down into subimpact areas such as system, media, protocol and node. The system section includes information on the system (e.g., hardware version, software version, part serial numbers, etc.). The media section includes information on the state of the communication media coupled to a network element (e.g., is there packet loss, severely errored seconds, etc.). The protocol section includes information on communication standards applicable to a network element (e.g., is traffic communicated in accordance with TCP/IP requirements, apple talk requirements, Ethernet requirements, etc.) The node section includes environmental information (e.g., is a processor hot).

In one exemplary implementation of a present invention, an optical concentrator net audit tool system and method utilizes a unique methodology to analyze the "health" of a network. The present invention net audit methodology determines the characteristics of devices (e.g., an optical concentrator) within a network, compares the results to a set of established net rules, and identifies net rule exception points (NREPS). In one embodiment of the present invention, the net rules comprise definitions of predefined thresholds for acceptable tolerances associated with different characteristics of the network, for example different acceptable tolerances for components included in an optical concentrator. In one embodiment of the present invention, the net rules provide a standard by which the readiness and stability of a node is measured. In one embodiment the points are used to identify problems and potential problems.

In one embodiment of the present invention, network communication device responses and problems are assigned to a category and NREPs are assigned according to each category. In one exemplary implementation of the present invention, results obtained from communication devices are divided into either an acceptable category, a warning category or a critical category. Each category is associated with predetermined parameter thresholds. In one exemplary implementation in which the results include information on errored seconds associated with a communication device, errored seconds within an acceptable predetermined range (e.g., 500 Seconds to 700 Seconds) is associated with the acceptable category, a questionable predetermined range (e.g., 450 Seconds to 500 Seconds) is associated with a warning category and an unacceptable range (e.g., 0 Seconds to 450 Seconds) is associated with a critical category.

The warning and critical audit results appear within network communication device audit tables in a different manner than acceptable audit results. For example, a warning threshold exceptions are presented in a special font (e.g., bold font) and in a contrasting color (e.g., yellow) and critical threshold exceptions are displayed distinguishing font (e.g., bold) and different color (e.g., red). The warnings are indicative of possible or potential problematic areas that should be considered for further investigation or corrective action. In one embodiment of the present invention, the warning category has a net rule exception point value of 1 which is assigned a device parameter (e.g., an optical concentrator laser power value) that is within the warning threshold ranges for the device parameter. Critical thresholds indicate a condition that requires prompt attention and corrective action. In one embodiment of the present invention, the critical category has a net rule exception point value of 1,000 which is assigned a device parameter (e.g., an optical concentrator laser power value) that is within the critical threshold ranges for the device parameter.

Figure 2A:
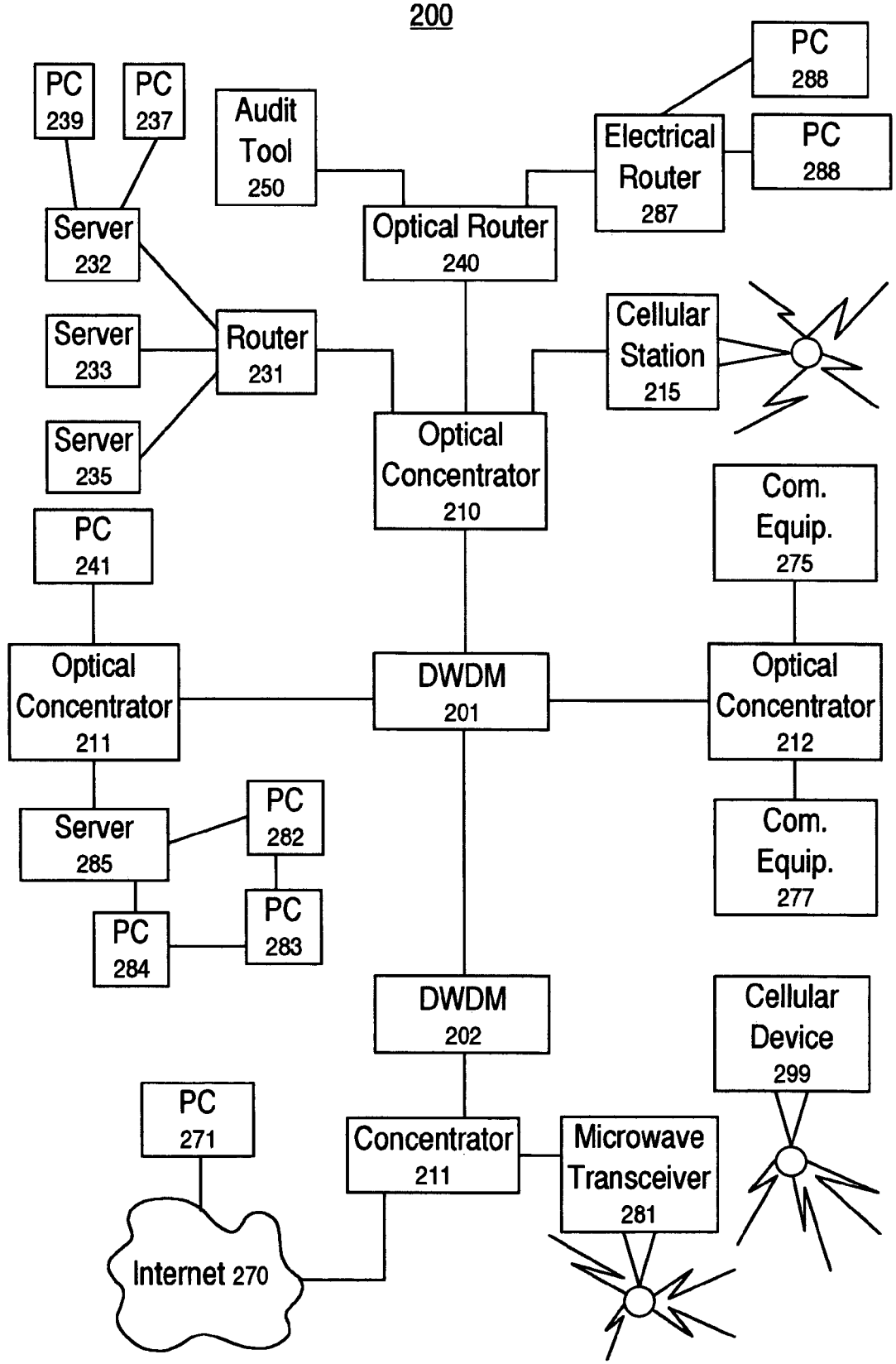
FIG. 2A is a block diagram of communications network that includes a present invention automated network communication device audit tool.

FIG. 2A is a block diagram of communications network 200. In one embodiment of the present invention, automated network communication device audit tool method 100 is implemented in communications network 200. Communications network 200 comprises network communication device audit tool system 250, dense wave division multiplexer (DWDM) 201 and 202, optical concentrators 210, 211, 121 and 217, routers 231, 240 and 287, cellular station 215, cellular device (e.g., phone, handheld computer, etc.) 299, microwave transceiver 281, internet 270, servers 285, 232, and 233, personal computers 235, 237, 239, 241, 271, 282, 283, 284, 288 and 289, and miscellaneous communication equipment 275 and 277. The components of communications network 200 communicate with each other over a variety of architectures utilizing numerous communication protocols. One exemplary implementation of communications network 200 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc. Network communication device audit tool system 250 audits the components of communications network 200.

The components of communications network 200 comprise network elements including nodes. For example, optical concentrator 210 has a chassis, a power supply and a mother board. The mother board comprises a plurality of printed circuit board (PCB) slots and busses between the slots. One slot includes a system board that comprises a processor and memory. The other slots include line cards such as a DS1 card, DS3 card, OC3 card, OC12 card, OC 48 card and OC192 card. Each of the line cards includes one or more ports. In one embodiment of the present invention, optical concentrators 210 provides cross connection between the facilities (e.g., line slots) with the ability to aggregate ("concentrate") communications from a number of electrical communication lines (e.g., DS ports) to an optical communication line (e.g., a OC port).

Figure 2B:
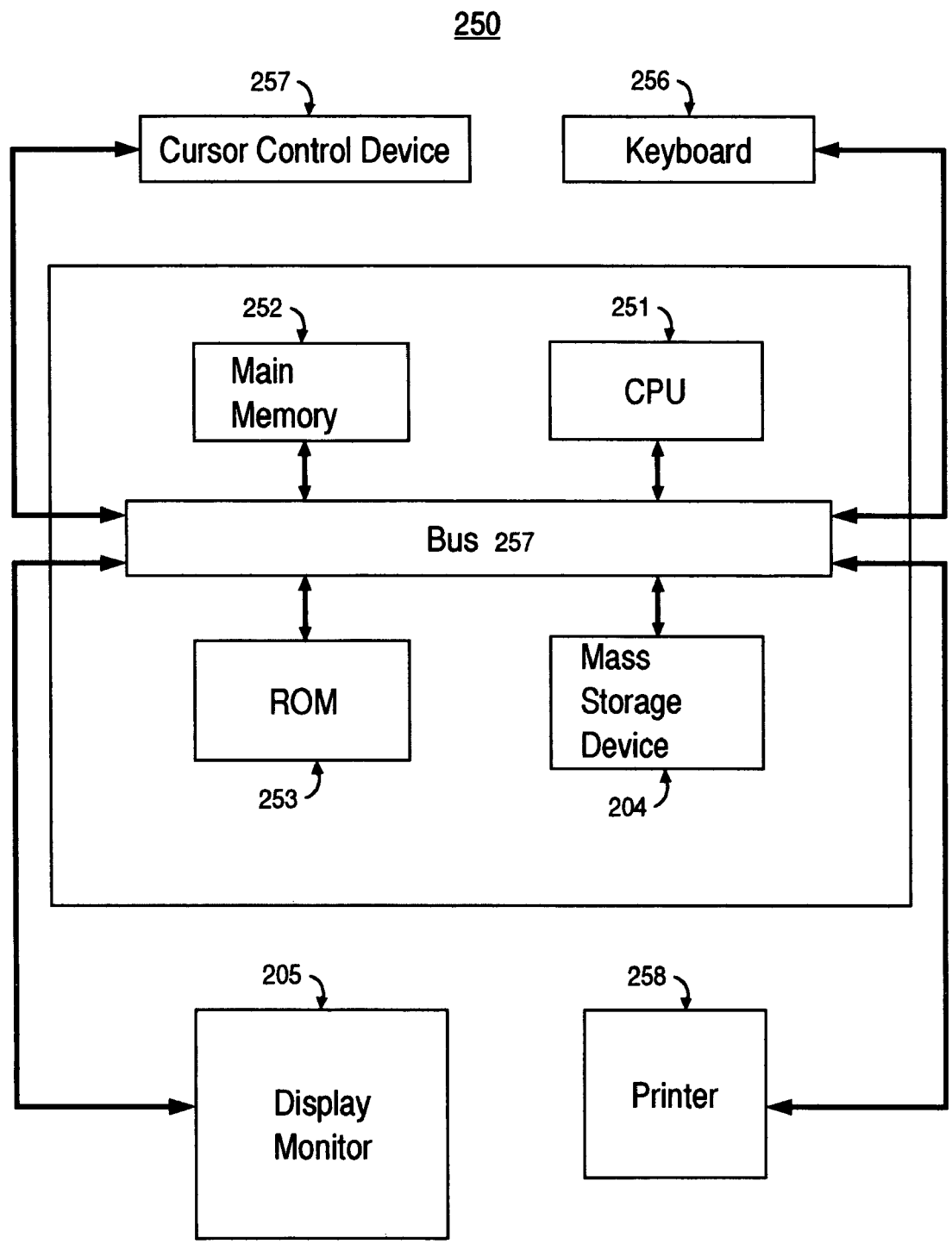
FIG. 2B is a block diagram of an automated network communication device audit tool, one embodiment of the present invention.

FIG. 2B is a block diagram of automated network communication device audit tool 250, one embodiment of the present invention. In general, automated network communication device audit tool 250 comprises a bus 257, a central processor 251, a random access memory 252, a read only memory 253, a data storage device 254, a display device 255, an alphanumeric input device 256, a cursor control device 257 and a printer 258. Bus 257 is coupled to central processor 251, random access memory 252, read only memory 253, data storage device 254, display device 255, alphanumeric input device 256, cursor control device 257 and printer 258.

The components of automated network communication device audit tool 250 cooperatively operate to perform their designated functions. Central processor 251 processes information and instructions including instructions associated with automated network communication device audit method 100. Random access memory 252 stores information and instructions for the central processor 251. Read only memory 253 stores static information and instructions for the processor 251. Data storage device 204 stores information and instructions (e.g., such as a magnetic or optical disk and disk drive). Display device 255 displays information to a computer user. Alphanumeric input device 256 includes alphanumeric and function keys for communicating information and command selections to the central processor 251. Cursor control device 257 communicates user input information and command selections to the central processor 251. Printer 258 prints documents in accordance with directions from central processor 251. Bus 257 is a path for communicating information. In one embodiment of the present invention, automated network communication device audit tool 250 also operates as an automated network communication audit intelligent backend.

The components of automated network communication device audit tool 250 comprise a variety of interchangeable embodiments. For example, the display device 255 of FIG. 2B may be a liquid crystal device, cathode ray tube, or other display device suitable for creating graphic images and alphanumeric characters recognizable to the user. It is also to be appreciated that there are many implementations of cursor control device 257, including a trackball, mouse, joystick or a number of other specially adapted cursor directing devices for providing input to direct and/or activate the cursor. In one embodiment of automated transaction information management server 250, keys on alphanumeric input device 255 are also capable of signaling movement of a given direction or manner of displacement. For example, the cursor may be directed and/or activated via input from the keyboard of alphanumeric input device 255 using special keys and key sequence commands. Cursor control device 257 of automated transaction information management server 250 allows a computer user to dynamically signal the two dimensional movement of a cursor or visible symbol (pointer) on a display screen of the display device 255. Alternatively alphanumeric input device 255 allows the user to create graphic images and alphanumeric characters on a display screen of the display device 255.

Automated network communication device audit tool system 250 is a platform the performs automated network communication device audit tool method 100 and produces communication network device audit report 300 in one embodiment of the present invention. FIG. 3 is a block diagram illustration of one embodiment of network communication device audit report 300. Audit report 300 includes an executive summary section 310, net audit detail section 320, net audit task list section 330 and appendix section 340. Executive summary section 310 includes an executive summary that provides an overview of the "health and stability" of a communications device and results of the audit. Net audit detail section 320 includes audit detail tables that provide detailed information in a convenient user friendly format. In one embodiment of the present invention the net audit detail section is organized by type of network device and includes identification on a node by node basis of device values, expectations, and net rule exception points. Net audit task list section 330 includes a list that provides a hierarchical presentation of network device problems and potential problems in order of adverse impact on the reliability of a communication network. In one exemplary implementation of the present invention, the network audit task list provides a convenient summary of network rule exceptions on a node by node basis and suggested order of addressing problems. Appendix section 340 provides additional helpful information for interpreting the audit report.

Figure 4D:
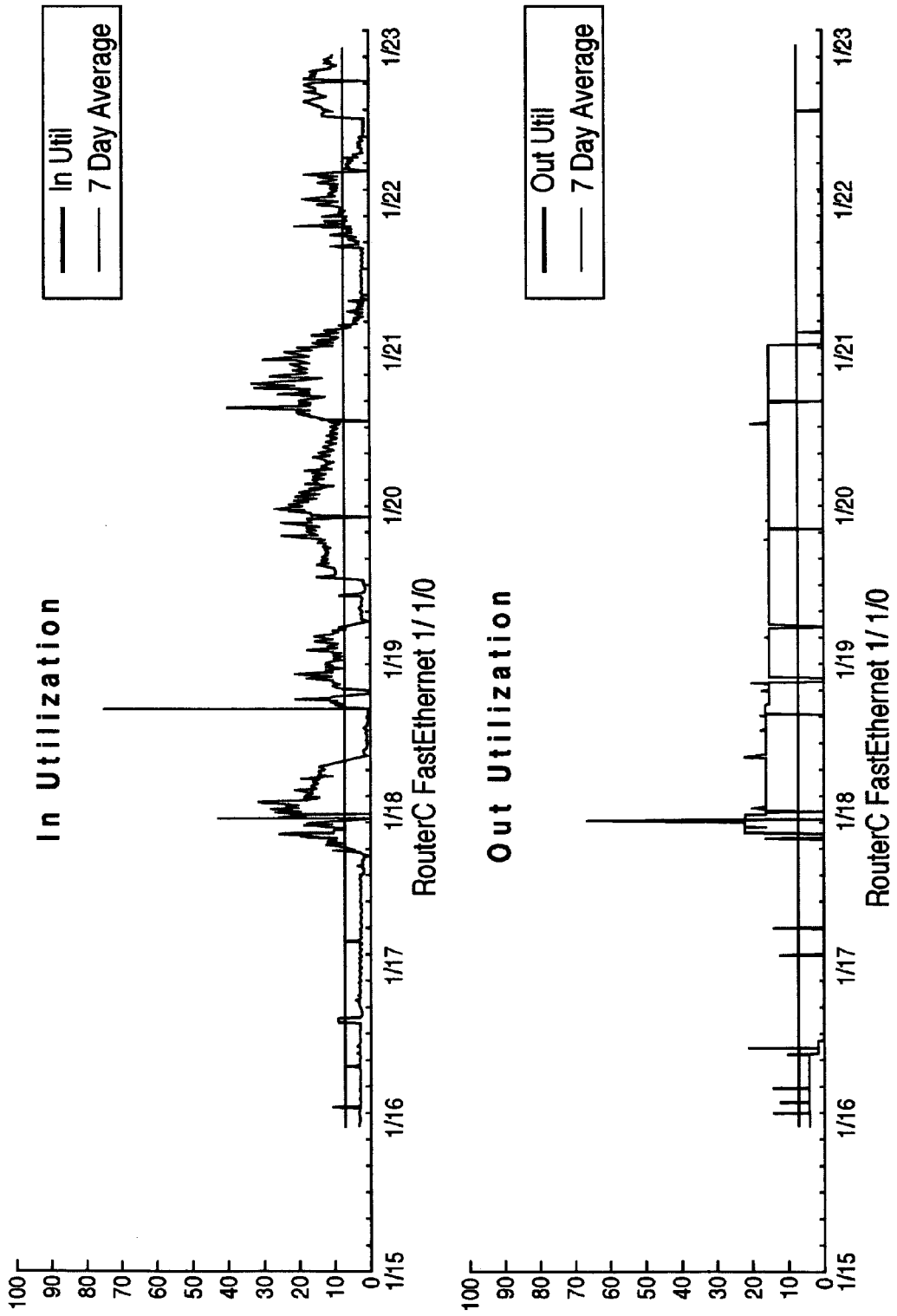
FIG. 4D is an illustration of one embodiment of a present invention network audit data collection graph section.

FIG. 4A is an illustration of automated network communication device audit report executive summary section 400 included in one embodiment of the present invention. Network audit report executive summary section 400 comprises introduction to network device audit section 410, network audit data collection summary section 420, network audit data collection graph section 430, and network audit NREP summary section 440. Introduction to network device audit section 410 provides an introduction to the network device audit including a brief description of the device the audit is directed to (e.g., an optical concentrator) and the function of the device within the network. FIG. 4B is an illustration of one exemplary implementation of introduction to network device audit section 410. Network audit data collection summary section 420 provides a convenient tabular formulation of the time the audit report covers and the number of unreachable nodes that are not analyzed by the audit. FIG. 4C is an illustration of one exemplary implementation of network audit data collection summary section 420. Network audit data collection graph section 430 provides a graphical representation of the network audit data collection. For example, network audit data collection graph section includes a graph of warning or critical indication over time or a highest traffic analysis graph that indicated the top ten communication devices with highest aggregate bytes, or the sum of total transmit and received octects. FIG. 4D is an illustration of one exemplary implementation of network audit data collection graph section 430. The net audit NREP summary includes an indication of the net audit health of a network communication device and an indication of the networks capabilities and performance. Network audit NREP summary section 440 provides a quick reference summary of the NREP indications.

FIG. 4E is an illustration of one exemplary implementation of network audit NREP summary section 440 comprising NREP category table 471, network audit health section 472, NREP summary table 473, NREP's ratio by category graph, network audit notes section 475, and NREP node correlation table 477. NREP category table 471 identifies and defines NREP categories and provides an indication of the NREPs assigned to each NREP category. Network audit health section 472 provides a convenient overall network audit health indicator. In one exemplary implementation of the present invention, the convenient overall network audit health indicator is a percentage indication equation such as (100-(total NREPs/total possible NREPs)100). NREP summary table 473 provides a convenient tabular summary of the total NREPs in each NREP category and total NREPs for the network. NREP's ratio by category graph includes a graphical representation of the NREPs by category. Network audit notes section 475 includes notes associated with the network audit. NREP node correlation table 477 includes a correlation of the NREPs to impact areas.

FIG. 5 is an illustration of net audit detail section 500, one embodiment of a present invention net audit detail section. The net audit detail section provides information in convenient and efficient manner. Net audit detail section 500 comprises net audit detail impact sections and subsections. Each of the net audit detail impact sections comprises information associated with a network impact area arranged in subimpact categories. In one exemplary implementation of the present invention, net audit detail section 500 comprises impact sections such as a configuration management section 510, a fault management section 520, a performance management section 530, and a capacity management section 540. Information in each of the impact sections is arranged according to subimpact areas such as system, media, node, and protocol.

In one embodiment of the present invention, a net audit detail section also includes a subimpact area net audit detail summary table. FIG. 6 is an illustration of subimpact area net audit detail summary table 600 included in one embodiment of a present invention. Subimpact area net audit detail summary table 600 comprises a tabular listing of net rule exception points by node and impact area. This format of subimpact area net audit detail summary table 600 provides a quick and accurate overview of problems and potential problems associated with a subimpact area broken down by nodes included in the network element. In one exemplary implementation of the present invention, a subimpact area net audit detail summary table 600 is provided for each subimpact area (e.g., system, media, protocol, node, etc.).

FIG. 7A is an illustration of a network element table 710 included in one embodiment of the present invention for an optical concentrator. In one exemplary implementation of the present invention, network element table 710 is included in configuration management section 510 system subsection 511. Network element table 710 lists the elements (e.g., optical concentrators) included in a network and the associated internet protocol (IP) address, node identification (ID), synchronous transmission mode (STM), and timing mode for each network element.

FIG. 7B is an illustration of board table 720 included in one embodiment of the present invention. In one exemplary implementation of the present invention board table 720 is included in configuration management section 510 system subsection 511. The board table lists printed circuit boards (PCBs) included in a network element, the slot number occupied by the PCBs, the part numbers of the PCBs, the serial numbers, the hardware versions, firmware versions and the status of each PCB.

FIG. 7C is an illustration of a bits and synchronization reference table 730 included in one embodiment of the present invention. Bits and synchronization reference table 730 is included in configuration management section 510 protocol subsection 513 in one exemplary implementation of the present invention. The bits and synchronization table lists the configuration settings for a network element.

FIG. 7D is an illustration of a network element protection table 740 included in one embodiment of the present invention. Network element protection table 740 is included in configuration management section 510 protocol subsection 513 in one exemplary implementation of the present invention. The network element protection table 740 lists a protection scheme that is configured on a network element.

FIG. 7E is an illustration of a optical facilities protection table 750 included in one embodiment of the present invention. Optical facilities protection table 750 is included in configuration management section 510 protocol subsection 513 in one exemplary implementation of the present invention. The optical facilities protection table 750 lists an optical service protection scheme that is configured on a network element.

FIG. 7F is an illustration of a cross connect table 760 included in one embodiment of the present invention. Cross connect table 760 is included in configuration management section 510 protocol subsection 513 in one exemplary implementation of the present invention. The cross connect table displays the cross connects configured on the network element.

FIG. 7G is an illustration of DS1 service parameters table 770 included in one embodiment of the present invention. DS3 service parameters table 770 is included in configuration management section 510 media subsection 512 in one exemplary implementation of the present invention. The DS1 parameters table lists configuration and fault information for a DS1 facility (e.g., a DS1 slot) configured within a network element.

FIG. 7H is an illustration of DS3 service parameters table 780 included in one embodiment of the present invention. DS3 service parameters table 780 is included in configuration management section 510 media subsection 512 in one exemplary implementation of the present invention. The DS3 service parameters table lists configuration and fault information for a DS3 facility (e.g., DS3 slot) configured within a network element.

FIG. 7I is an illustration of optical service parameter table 790 included in one embodiment of the present invention. Optical service parameter table 790 is included in configuration management section 510 media subsection 512 in one exemplary implementation of the present invention. The optical services parameters table lists configuration and fault information an optical facility configured within the network element.

FIG. 8A is an illustration of network element field notice table 810 included in one embodiment of the present invention. Network element field notice table 810 is included in fault management section 520 media subsection 522 in one embodiment of the present invention. Network element field notice table 810 lists known product field notices know to possibly result in service interruptions. In one exemplary implementation of the present invention, network element field notice table 810 provides an indication that the field notice problems should be corrected immediately.

FIG. 8B is an illustration of alarm status table 820 included in one embodiment of the present invention. Alarm status table 820 is included in fault management section 520 media subsection 522 in one exemplary implementation of the present invention. Alarm status table 820 lists network element alarms.

FIG. 9A is an illustration of electrical performance table near end 910 included in one embodiment of the present invention. Electrical performance table far end 910 is included in performance management section 530 protocol subsection 533 in one exemplary implementation of the present invention. The electrical performance table lists performance and fault information for all the electrical facilitates configures within the network element when referenced from the near end.

FIG. 9B is an illustration of optical performance table far end 920 included in one embodiment of the present invention. Optical performance table far end 930 is included in performance management section 530 protocol subsection 533 in one exemplary implementation of the present invention. The optical performance table lists performance and fault information for all the optical facilitates configures within the network element when referenced from the near end.

FIG. 9C is an illustration of optical performance table 930 included in one embodiment of the present invention. Optical performance table 930 is included in performance management section 530 system subsection 531 in one exemplary implementation of the present invention. The optical performance table lists performance and fault information for all the optical facilitates (e.g., OS) configured within the network element when referenced from the far end.

FIG. 10A is an illustration of a capacity planning table 1010 included in one embodiment of the present invention. Capacity planning table 1010 is included in configuration management section 540 system subsection 511 in one exemplary implementation of the present invention. The capacity planning table displays the current configuration and slot position of cards in the network element and the availability of slots for future expansion.

A present invention net audit task list section (e.g., net audit task list section 330) provides guidance on a corrective plan of action for problems with network communication devices. In one embodiment of the present invention, a network communication device audit task list provides network specific information system by system that assists implements of recommended corrective measures. FIG. 10B is an illustration of network communication device audit task list 1020, one embodiment of a present invention network communication device audit task list. Network communication device audit task list 1020 lists the "worst" ranking audited network communication device nodes at the top of the list in which ranks are based on the assigned NREPS to each node. In one exemplary implementation, the net audit task list is utilized to easily reference information about the "bad" systems as well as comments, corrective advice and relevant appendix information.

An appendix section of the present invention (e.g., appendix section 340) provides additional helpful information for interpreting the audit report and understanding a network element. In one embodiment of the present invention includes a network advice section, a supporting reference section, and a device unreachable section. The network advice section provides details on the NREPs, values and exceptions. The supporting reference section includes information that assist interpretation of the terms utilized in the network audit report. In one exemplary implementation of the present invention provides a glossary and definition of acronyms utilized in the network audit report. The device unreachable section provides identification of devices not reached during the audit process by the present invention. FIG. 10C is an illustration of device unreachable table 1030, one embodiment of a present invention device unreachable table. In one exemplary implementation device unreachable table 1030 includes information explaining potential reasons for the inability to interact with a network communication device.

A present invention automated network communication device audit tool system and method automates the arduous process of gathering, parsing, analyzing, and organizing information required to create the net audit detail section reports. For example, automated network communication device audit tool system and method 200 automatically performs the tasks required to create concentrator optical performance near end table 920, such as formulation of commands compliant with precise syntax requirements, interpretation of convoluted retrieved information, identification of problems and reorganization of information for reporting in a convenient user friendly format. FIGS. 11A and 11B are block diagram illustrations of exemplary commands, retrieved network element information and guidelines for interpreting the retrieved information in one exemplary implementation of the present invention.

The command 1101 in FIG. 11A and the command 1111 in FIG. 11B for gathering network communication device information are automatically configured by one embodiment of the present invention in the appropriate syntax format for an optical concentrator. For example, a present invention network audit system and method issues a command to retrieve inventory information on each slot included in an optical concentrator (e.g., command 1101 in FIG. 11A). FIG. 11D is a tabular compilation of commands utilized to obtain information from an optical concentrator in one exemplary implementation of the present invention. The italicized variables in the commands shown in FIG. 11D are an indication of variables associated with particular network communication devices that the present invention automatically configures in the appropriate syntax. The present invention receives information in response to the commands (e.g., the retrieve command 1101 or retrieve optical performance of an OC48 command 1111) and correlates the information to the cells in the near end optical performance table 920 according to the guidelines shown in correlation sections 1103 and 1113 of FIG. 11A and FIG. 11B respectively.

In one embodiment, the present invention receives information in response to a command (e.g., retrieve command 1101) and performs a parsing process by establishing boundaries for portions of the received information. The boundaries are utilized to define information associated with a characteristic of a network element (e.g. configuration, performance or functionality information). For example, the characteristics are related to a column in a network audit table such as near end optical performance table 920. In one exemplary implementation, the present invention utilizes an intelligent backend expert system and parsing code software instructions to establish the boundaries and correlate the retrieved information to the boundaries. For example, the backend intelligent system includes information on the number of bits associated with a characteristic, counts over that number of bits and correlates those bits with the category and/or the backend intelligent system is capable of recognizing a character (e.g., a comma or semicolon, etc.) or character string (e.g., HWVER=A0) included in the gathered information and correlating the character strings with a characteristic.

FIG. 11A and FIG. 11B are shown so that the parsing of retrieved information may be more easily understood. The index identifiers included in section 1107 (which are a the same as those shown in index number column 1104) are not included in the retrieved information, they are merely shown to illustrate the automated correlation of the retrieved information to cell in near end optical performance table 920. FIG. 11A index correlation section 903 and FIG. 11B index correlation section 913 show a tabular representation of index correlation utilized to make correlations between information received from a network element (e.g., section 1109) and presentation of the information in a network audit detail table. For example, the field names shown in column 1105 correspond to the column headings in column in near end optical performance table 920.

FIG. 11C is a block diagram illustration of a partially populated exemplary far end optical performance table. Please note that the information shown in row 1131 does not appear in the actual far end optical performance table, it is shown in FIG. 11C so as to provide an indication of the parsing relationship of the information shown in row 1132 to the information received from the network elements (e.g., section 1109). The information shown in row 1133 does not appear in the actual far end optical performance table, it is shown in FIG. 11C so as to provide an indication of NREP application to the information shown in row 1132. FIG. 11E and FIG. 11F are a tabular illustration of network rules utilized in one exemplary implementation of the present invention. In one exemplary implementation of the present invention, relevant network rules and/or corrective advice is provided below the network communication device audit tables comprising indications of warning or critical problems.

In one embodiment of the present information corrective advice is included in a network communication device audit table. In one exemplary implementation of the present invention, the corrective advice includes identification of potential causes of a problem and suggested remedial course of action. The identification of potential problems and suggested remedial courses permits a user to leverage the significant communication network device expertise accumulated and stored by a present invention automated network communication device audit tool system and method. In one exemplary implementation, the information provides a user with insightful assistance and information that took many hours of trouble shooting a wide variety of communications in a number of environments subject to common and extraordinary operating constraints and performance levels. In one embodiment, an automated network communication device audit tool system and method tracks indications of problems with a communication device and a course of action that corrected the problem. When those indications appear again associated with the communication device, a automated network communication device audit tool system and method suggests it may be the same type of problem and a similar course of corrective action. In one embodiment of the present invention, potential problems and corrective courses of action are listed in a manner indicating the most likely cause of the problem and the course of action most likely to correct the problem.

The identification of problems and suggested courses of action cover a wide variety of communications devices and operating scenarios. In one exemplary implementation of the present invention, identification of a problem associated with a coding violation indication on an optical concentrator includes an indication that causes of coding violations can be noise, electrical or mechanical failures due to either circuit issues or with the linecard itself. If multiple lines from the same card exhibit the same symptoms the problem could be linecard related. Individual instances could be circuit specific. To help isolate the problem further suggested testing includes as BIT Error Rate tests, mapping and demapping tests, payload pointer investigation, and embedded overhead or line interface testing. FIG. 12 is one exemplary implementation of a network element field notice table (e.g., network element field notice table 810) with corrective advice. FIG. 13 is one exemplary implementation of a present invention table included in a appendix with information on commands, impact areas, polling frequency, rule information, potential causes of a problem and suggested corrective measures.

The amount of information that is required to be parsed to provide the optical performance table far end table is quite significant. The retrieved information shown in section 902 of FIG. 9A covers one node of one network element, and in a typical network there are multiple nodes and network elements. The retrieved information shown in section 912 of FIG. 9B covers one slot of one node, and as indicated in FIG. 9A there are typically multiple slots for each node. The number of lines of retrieved information that is shifted through, parsed and analyzed to provide optical performance table far end table is exponentially greater. To manually produce audit network tables an optical concentrator requires significant resources and is subject to numerous error. For example, the amount of syntax sensitive code that is transmitted and received is highly susceptible to manual entry and interrelation errors. However, the present invention automates the process and reduces the susceptibility to manual entry and interrelation errors.

Thus, the present invention is a system and method that facilitates audits of network device performance and presents results in a convenient and user friendly format. A present invention network communication device audit tool system and method assists efficient and network management and maintenance operations capable of addressing complicated troubleshooting problems in advanced communication networks. The network communication device audit tool system and method provides reduction in the resources required to examine the operation of communication devices and identify when a communication device is not operating within relatively stringent performance parameters, indicate potential causes of the problem and suggest appropriate courses of action. The information is presented in a user friendly manner with a consistent look and feel for a variety of communication network device audits. The network communication device audit tool system and method aids maintenance and management operations involving complicated protocols with obscure precise codes that are syntax sensitive and produce obfuscated data results presented in complicated formats while promoting accurate interpretation, thoughtful analysis and insightful recommendations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An automated network communication device audit tool method comprising the steps of:

gathering communication device information, including actual configuration, performance and functionality characteristics of a communication device automatically, wherein said communication device information is gathered by automatically generating and forwarding commands;

parsing said gathered communication device information automatically, including identifying portions of said communication device information and correlating said portions of said communication device information to an operation or characteristic of a network communications device, wherein said characteristic of said communications device is an actual configuration, performance or functionality characteristic of a communication device;

determining if additional communication device information is required;

analyzing characteristics and operations of said network communications device automatically, including said configuration, performance and functionality characteristics; and reporting said communication device information in a convenient format including identification of problems.

2. The automated network communication device audit tool method of claim 1 wherein said analyzing includes comparing actual configuration, performance and functionality of said communication device to a set of established net rules comprising definitions of predefined thresholds for acceptable tolerances associated with different characteristics of said communication device and net rule exception points (NREPS) are assigned to identified net rule exceptions, and said net rule exception points are used to identify problems and potential problems.

3. The automated network communication device audit tool method of claim 1 comprising the step of performing a network communication device query process that automatically queries said communication device.

4. The automated network communication device audit tool method of claim 3 wherein said query process automatically queries an optical concentrator.

5. The automated network communication device audit tool method of claim 1 wherein said gathering communication device information automatically comprises:

determining the appropriate syntax for formulating a query command for each particular communication device from a plurality of different types communication devices; and automatically constructing the queries by issuing protocol commands formatted in the appropriate syntax for said communication device.

6. The automated network communication device audit tool method of claim 1 wherein an automated intelligent expert network communication device audit analysis process is utilized to analyze the performance of said communication device in a communication network.

7. The automated network communication device audit tool method of claim 1 wherein an analysis process utilizes an intelligent backend to analyze parsed information.

8. The automated network communication device audit tool method of claim 7 wherein parsed communication device information is compared to values included in an expert network audit database of said intelligent backend.

9. The automated network communication device audit tool method of claim 7 wherein values included in said intelligent backend include thresholds parameters that indicate acceptable configuration, performance and functionality.

10. An automated network communication device audit tool comprising:

a bus for communicating information;

a central processor for processing information and instructions including instructions associated with an automated network communication device audit method, including automatically configuring and sending commands to gather communication device information, parsing gathered communication device information automatically, including identifying portions of said communication device information and correlating said portions of said communication device information to an operation or characteristic of a network communications device, wherein said characteristic of said communications device is a configuration, performance or functionality characteristic, said central processor is coupled to said bus;

a memory for storing said information and instructions for said central processor, said memory coupled to said bus; and a display device for displaying network communication device audit information to a user, said display device coupled to said bus.

11. An automated network communication device audit tool of claim 10 wherein said network communication device audit information includes device configuration information, performance level information, and identification of parameters that do not meet threshold levels.

12. An automated network communication device audit tool of claim 10 wherein said network communication device audit information includes a network communication device audit report that has the same user friendly look and feel for a variety of devices across different architectures and is organized in a manner that facilitates network management and maintenance.

13. An automated network communication device audit tool of claim 12 wherein said network communication device audit report presents information associated with different areas of network management impact.

14. An automated network communication device audit tool of claim 13 wherein said areas of network management impact areas includes fault management, performance management, capacity management, and configuration management.

15. An automated network communication device audit tool comprising:

a bus for communicating information;

a central processor for processing information and instructions including instructions associated with an automated network communication device audit method to analyze the health of a network communication device automatically, including configuration, performance or functionality characteristics, wherein a communication device audit methodology implemented by said central processor determines the characteristics of a communication device, compares the results to a set of established net rules, and identifies net rule exceptions, said central processor is coupled to said bus;

a memory for storing said information and instructions for said central processor, said memory coupled to said bus; and a display device for displaying network communication device audit information including information associated with said health of said network communication device, said display device coupled to said bus.

16. An automated network communication device audit tool of claim 15 wherein said established net rules comprise definitions of predefined thresholds for acceptable tolerances associated with different characteristics of said communication device including different acceptable tolerances for components of an optical concentrator.

17. An automated network communication device audit tool of claim 15 wherein said communication device audit methodology includes the assignment of net rule exception points (NREPS) to identified net rule exceptions.

18. An automated network communication device audit tool of claim 17 wherein said net rule exception points are used to identify problems and potential problems.

19. An automated network communication device audit tool of claim 18 wherein said problems and potential problems are indicated within a network communication device audit table in a different manner than acceptable audit results.

20. An automated network communication device audit tool of claim 19 wherein warning threshold exceptions are presented in a special font and in a contrasting color and critical threshold exceptions are displayed in a distinguishing font and different color.

21. An automated network communication device audit tool of claim 15 wherein an intelligent backend identifies potential causes of a problem.

22. An automated network communication device audit tool of claim 15 wherein an intelligent backend provides a suggested corrective course of action for a problem based upon net rule exception points.

23. An automated network communication device audit tool comprising:
   a means for gathering communication device information by automatically creating query commands in a format and syntax compatible with each one of a plurality of different communication devices;
   a means for parsing said gathered communication device information automatically, including identifying portions of said communication device information and correlating said portions of said communication device information to an operation or characteristic of a network communications device, wherein said characteristic of said communications device is a configuration, performance or functionality characteristic;
   a means for determining if additional communication device information is required;
   a means for analyzing the characteristic and operations of said network communications device automatically, including said configuration, performance and functionality characteristics, wherein the characteristics of a communication device are compared to a set of established net rules and net rule exception points are identified; and
   a means for reporting said communication device information in a convenient format including identification of problems.

24. The automated network communication device audit tool of claim 23 comprising a means for performing a network communication device query process that automatically queries said communication device, wherein said queries are directed to retrieving information about said communication device and the status of said communication device.

25. The automated network communication device audit tool of claim 24 wherein said query process automatically queries an optical concentrator.

26. The automated network communication device audit tool of claim 23 wherein said established net rules comprise definitions of predefined thresholds for acceptable tolerances associated with different characteristics of said communication device and said automated intelligent expert network communication device analysis process includes assignment of net rule exception points (NREPS) to identified net rule exceptions, and said net rule exception points are used to identify problems and potential problems.

27. The computer readable medium having stored thereon computer readable instructions of claim 26, which when executed by a computer system of an automated network communication device audit tool cause the computer system to implement a method for auditing a communications network device, the method further comprising the steps of:
   determining the characteristics of said communication device;
   comparing the results to a set of established net rules; and
   identifying net rule exceptions.

28. The computer readable medium having stored thereon computer readable instructions of claim 27, which when executed by a computer system of an automated network communication device audit tool cause the computer system to implement a method for auditing a communications network device, wherein said established net rules comprise definitions of predefined thresholds for acceptable tolerances associated with different characteristics of said communication device including different acceptable tolerances for components of an optical concentrator.

29. The computer readable medium having stored thereon computer readable instructions of claim 27, which when executed by a computer system of an automated network communication device audit tool cause the computer system to implement a method for auditing a communications network device, the method further comprising the step of assigning net rule exception points (NREPS) to identified net rule exceptions.

30. The computer readable medium having stored thereon computer readable instructions of claim 29, which when executed by a computer system of an automated network communication device audit tool cause the computer system to implement a method for auditing a communications network device, wherein said net rule exception points are used to identify problems and potential problems, and said problems and potential problems are indicated within a network communication device audit table in a different manner than acceptable audit results.

31. The computer readable medium having stored thereon computer readable instructions of claim 30, which when executed by a computer system of an automated network communication device audit tool cause the computer system to implement a method for auditing a communications network device, wherein warning threshold exceptions are presented in a special font and in a contrasting color and critical threshold exceptions are displayed in a distinguishing font and different color.

32. A computer readable medium having stored thereon computer readable instructions, which when executed by a computer system of an automated network communication device audit tool cause the computer system to implement a method for auditing a communications network device, the method comprising the steps of:
   gathering communication device information, including actual configuration, performance and functionality characteristics of a communication device automatically, wherein said communication device information is gathered by automatically generating and forwarding commands;
   parsing said gathered communication device information automatically, including identifying portions of said communication device information and correlating said portions of said communication device information to an operation or characteristic of a network communications device, wherein said characteristic of said communications device is an actual configuration, performance or functionality characteristic;
   determining if additional communication device information is required;

analyzing the characteristic and operations of said network communications device automatically, including said configuration, performance or functionality characteristics; and reporting said communication device information in a convenient format including identification of problems.

33. The computer readable medium having stored thereon computer readable instructions of claim 32, which when executed by a computer system of an automated network communication device audit tool cause the computer system to implement a method for auditing a communications network device, said method further comprising the steps of:

identifying potential causes of a problem; and providing a suggested corrective course of action for a problem.

* * * * *